June 20, 1961 J. PANAVAS 2,989,094
ADJUSTABLE STOPS AND GUIDE BAR FOR POWER TOOL
Filed Nov. 18, 1958
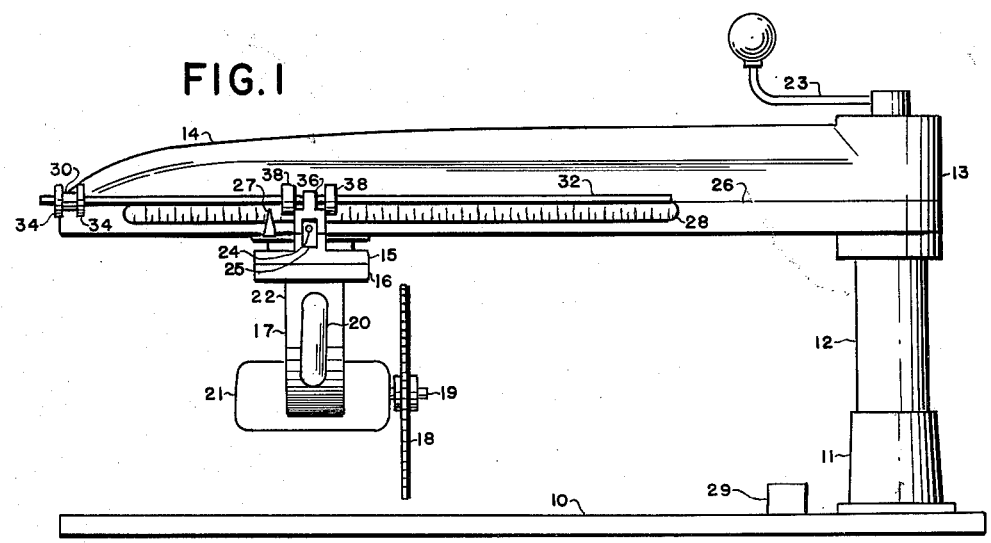
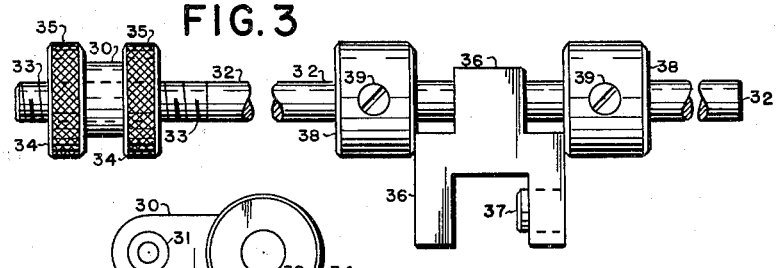
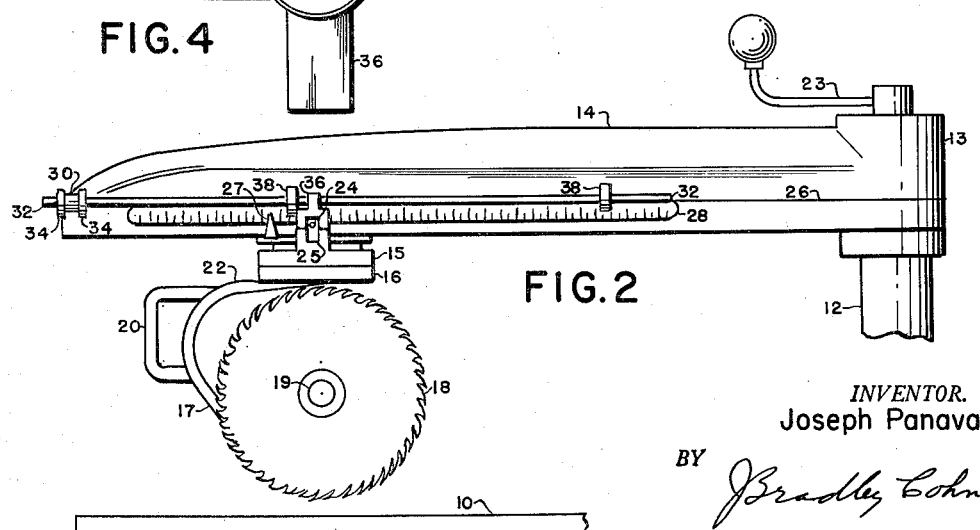
INVENTOR.
Joseph Panavas
BY
ATTORNEY United States Patent Office 2,989,094
Patented June 20, 1961

2,989,094
ADJUSTABLE STOPS AND GUIDE BAR FOR POWER TOOL
Joseph Panavas, Detroit, Mich., assignor, by mesne assignments, to De Walt, Inc., a corporation of Delaware
Filed Nov. 18, 1958, Ser. No. 774,538
1 Claim. (Cl. 143—6)

This invention relates in general to stop mechanisms and more particularly to combination limit setting and precision locking mechanism.

An object of this invention is to provide more easily adjustable limit stops for tools, gauges, and the like while also providing means to more accurately position and lock into place the tools, gauges, and the like.

Another object of this invention is to provide an inexpensive, easily manufactured mechanism to be used to set limits to restrict a motion while also being adapted to be used as a more accurate positioning and locking device.

A further object of this invention is to provide serviceable, accurate stops as well as a precision locking means which can be manufactured at relatively rough manufacturing tolerances.

A feature of this invention is the provision of a micro or screw positioned gauge bar which carries stops used to set limits of motion when the stops are locked a distance apart and which allows the stops to be secured about a moving element to hold the element to the gauge bar whereupon the element can be accurately located and locked by the screw positioning of the gauge bar.

Additional objects, advantages, and features of invention reside in the particular construction, arrangement and combination of parts involved in the embodiment of the invention and its practice otherwise as will be understood from the following description and accompanying drawing wherein:

FIG. 1 is a side view of a radial arm saw with the micro stop gauge bar shown mounted and set to be used as a positioning and a locking mechanism;

FIG. 2 is a side view of a radial arm saw with the micro stop gauge bar shown mounted and set to be used as limit stops;

FIG. 3 is a side view of the unmounted micro stop gauge bar with portions of the gauge bar broken away; and FIG. 4 is an end view of the unmounted micro stop gauge bar.

Referring to the drawings in detail, FIG. 1 and FIG. 2 show a radial arm saw having a work table 10 to which is fastened a mounting fitting 11 which supports the vertical column 12. Clamped to the top of the vertical column 12 is the shoulder 13 which is formed integrally with the horizontal arm 14. Slidably mounted to extend below the arm 14 is the elbow mount 15 to which is clamped the flange 16 supporting the yoke 17 holding the electric motor 21 which rotates the saw blade 18 mounted on the motor arbor 19. Since the entire carriage assembly 22 comprising those elements depending from the elbow mount 15 is slidably mounted below the arm 14, a hand grip 20 is fixed to the yoke 17 so the rotating saw blade 18 may be moved back and forth below the arm 14.

When it is desired to make a cut across boards or other material, the saw blade 18, as shown in FIG. 2, is set parallel to the arm 14 by unclamping the flange 16 from the elbow mount 15, rotating the flange 16 and the elements depending therefrom, and reclamping the flange 16 to the elbow mount 15. A board or other work piece may then be secured or held on the work table 10 in any suitable manner while the rotating blade 18 is moved through the material being cut by sliding the entire assembly 22 by means of the hand grip 20.

Various angles of cut may be made across a work piece by unclamping the shoulder 13 from the vertical column 12, swinging the arm 14 to the desired angle, and reclamping the arm 14. Additional standard adjustments, such as setting the height of the saw blade 18 from the work table 10 by rotating lever 23 to raise column 12 and varying the angle the saw blade 18 makes with the work table 10 by rotating the motor 21 on its trunnions in the yoke 17.

When long boards and the like are being cut lengthwise or ripped, the saw blade 18 should be secured at right angles to the arm 14 as shown in FIG. 1. Then the assembly 22 and thus the rotating blade 18 are locked in one position along the arm 14 while the work pieces are pushed along the work piece guide 29 to contact the saw blade 18. One manner of locking the assembly 22 to the arm 14 for such a ripping operation is to tighten the set screw 24 which extends through the block 25. Since the block 25 is fixed to the elbow mount 15, the set screw 24 contacts the flat surface 26 on the side of the arm 14 to prevent the elbow mount 15 from sliding on the arm 14.

Also fixed to the elbow mount 15 is the pointer 27 to indicate the width of a rip cut on the scale 28. The scale 28 is fixed on the flat surface 26 in such a way that the distance indicated on the scale 28 is the distance between the work piece guide 29 and the blade 18. When a set screw 24 or a knurled knob screw is used to lock the assembled 22, it is often hard to position the assembly 22 as the tightening of the set screw 24 often causes the assembly 22 to creep a small distance along the arm 14 as the set screw 24 presses against the arm 14 and rotates. Also the tightening of the set screw 24 defaces the flat surface 26 to further render the positioning of the assembly 22 difficult. The accurate positioning and locking of the assembly 22 is very important in the making of matched moldings, closely fitted furniture parts, and all precision work.

An embodiment of my invention as it may be used is shown in FIGS. 1, 2, 3 and 4. The invention as shown consists of a fixed member 30 secured to the arm 14 by means of a screw which passes through the counter sunk hole 31 FIG. 4. The outer end of the fixed member 30 is drilled to receive with a small clearance one end of the gauge bar 32 which has the threads 33 formed for a suitable distance along it. Screwed about the threads 33 on the gauge bar 32 on either side of the fixed member 30 are the micro adjusting members 34 having the knurled surfaces 35 to facilitate their being turned by hand. The other end of the gauge bar 32 extends with a moderate clearance through the sliding member 36 which is fixed to the block 25 by means of the set screw 37 to move with the assembly 22. Slidably disposed about the gauge bar 32 on either side of the sliding member 36 are the stops 38 which may be secured along the gauge bar 32 by means of the set screws 39. If it is desired, thumb screws or the like may be substituted for the set screws 39 or other equivalent securing means may be used.

Operation

As shown in FIG. 1, to accurately position and lock in place the assembly 22 and thus the blade 18, the pointer 27 is brought near the desired reading on the scale 28. The loosened stops 38 are then slid along the gauge bar 32 until they contact the sliding member 36 whereon they are secured on the gauge bar 32 by screws 39 to hold the gauge bar 32 to the sliding member 36 (FIGS. 1 and 3). Then the assembly 22 may be even more accurately positioned by turning a micro adjustment member 34 against the fixed member 30 to move the gauge bar 32, the stops 38, and the assembly 22 with a micrometer adjustment to the desired position with extreme accuracy. When the carriage assembly 22 is in the desired position, it is locked in place by tightening the other micro adjusting member 34 against the other side of the sliding member 36 to prevent any further motion of the gauge bar 32 and, by this means, the assembly 22.

As shown in FIG. 2 to set limits to the motion of the assembly 22 and the saw blade 18, the gauge bar 32 is locked to the fixed member 30 by tightening the micro adjusting members 34 against each side of the fixed member 30. Then the stops 38 are locked to the gauge bar 32 a proper distance apart so that the assembly 22 may be moved the desired distance between the stops 38.

This micro stop gauge bar is very inexpensive to manufacture as there are no close tolerances to hold and the gauge bar itself may be made from an ordinary piece of drill rod. Nevertheless, for an inexpensive mechanism, this invention allows precision positioning of the blade 18 as well as the setting of the stops 38 which could formerly only be accomplished with much more expensive mechanisms. Of course, if only the precision positioning is desired, a set screw or other securing means may be provided on the member 36 and the stops 38 omitted. In this case the accurate adjustment is still achieved by the nuts 34.

While I have disclosed this invention in the best form known to me, it will be apparent that this is purely exemplary as modifications in the construction, arrangement, and combination of parts and the substitution of equivalents, mechanically and otherwise may be made without departing from the spirit of the invention except as it may be more particularly limited in the appended claim where I claim:

In a power tool, the combination which comprises: a supporting column, a cantilevered radial arm secured thereto, a tool carriage slidably mounted upon said radial arm, a power-driven cutting tool secured to said tool carriage and depending therefrom, a longitudinal gauge bar disposed parallel to said radial arm, means including a fixed member secured to said radial arm for journaling said gauge bar, thereby allowing said gauge bar to have an axial movement thereof with respect to said radial arm, said radial arm having a series of graduations adjacent said gauge bar, a pair of adjustable stops slidably journaled upon said gauge bar, said tool carriage including an integral sliding member journaled upon said gauge bar intermediate said pair of adjustable stops, whereby said pair of adjustable stops may be spaced along said gauge bar to limit the length of travel of said tool carriage with respect to said radial arm, said gauge bar being provided with a thread formed thereon adjacent said fixed member, and a pair of internally-threaded micro-adjusting movable members mounted upon said gauge bar and engaging said thread formed thereon, one each of said pair of movable members being flush against a respective side of said fixed member, whereby said tool carriage may be moved into its approximate desired position along said radial arm as measured by said graduations, and said pair of adjustable stops may be brought flush against said integral sliding member, one each against a respective side thereof to thereby lock said tool carriage with respect to said gauge bar, and whereby one of said micro-adjusting movable members may be turned in one direction or another to either advance or retract said gauge bar axially thereof with respect to said fixed member, hence accurately positioning said tool carriage along said radial arm, the other of said micro-adjusting movable members then being turned in an opposite direction to lock said gauge bar with respect to said fixed member of said radial arm.

References Cited in the file of this patent

UNITED STATES PATENTS

| | | |
|---|---|---|
| 1,273,235 | Lamphere | July 23, 1918 |
| 1,618,341 | Howland | Feb. 22, 1927 |
| 1,865,759 | Hughes | July 5, 1932 |
| 1,867,922 | Nelson | July 19, 1932 |
| 2,340,953 | Gardner | Feb. 8, 1944 |